United States Patent [19]

Miyazawa et al.

[11] Patent Number: 5,794,204
[45] Date of Patent: Aug. 11, 1998

[54] INTERACTIVE SPEECH RECOGNITION COMBINING SPEAKER-INDEPENDENT AND SPEAKER-SPECIFIC WORD RECOGNITION, AND HAVING A RESPONSE-CREATION CAPABILITY

[75] Inventors: Yasunaga Miyazawa; Mitsuhiro Inazumi; Hiroshi Hasegawa; Isao Edatsune, all of Suwa, Japan

[73] Assignee: Seiko Epson Corporation, Tokyo, Japan

[21] Appl. No.: 536,563

[22] Filed: Sep. 29, 1995

[30] Foreign Application Priority Data

Jun. 22, 1995 [JP] Japan ................... 7-156529

[51] Int. Cl.⁶ ................... G10L 9/06; G10L 5/02
[52] U.S. Cl. ................... 704/275; 704/244; 704/251; 704/258
[58] Field of Search ................... 395/2.52, 2.53, 395/2.6, 2.84; 704/244, 251, 258, 275

[56] References Cited

U.S. PATENT DOCUMENTS

| | | | |
|---|---|---|---|
| 2,338,551 | 1/1944 | Stanko | 381/57 |
| 4,052,568 | 10/1977 | Jankowski | 704/233 |
| 4,319,085 | 3/1982 | Welch et al. | 704/255 |
| 4,336,421 | 6/1982 | Welch et al. | 704/243 |
| 4,712,242 | 12/1987 | Rajasekaran et al. | 704/253 |
| 4,713,777 | 12/1987 | Klovstad et al. | 704/233 |
| 4,713,778 | 12/1987 | Baker | 704/254 |
| 4,718,088 | 1/1988 | Baker et al. | 704/244 |
| 4,718,092 | 1/1988 | Klovstad | 704/239 |
| 4,718,093 | 1/1988 | Brown | 704/243 |
| 4,763,278 | 8/1988 | Rajasekaran et al. | 704/251 |
| 4,827,520 | 5/1989 | Zeinstra | 704/275 |
| 4,984,177 | 1/1991 | Rondel et al. | 704/277 |
| 5,040,212 | 8/1991 | Bethards | 704/275 |
| 5,091,947 | 2/1992 | Ariyoshi et al. | 704/2.6 |
| 5,117,460 | 5/1992 | Berry et al. | 704/275 |
| 5,278,944 | 1/1994 | Sasaki et al. | 704/212 |
| 5,297,183 | 3/1994 | Bareis et al. | 455/410 |
| 5,357,596 | 10/1994 | Takebayashi et al. | 704/275 |
| 5,384,892 | 1/1995 | Strong | 740/243 |
| 5,444,673 | 8/1995 | Mathurin | 368/63 |
| 5,481,644 | 1/1996 | Inazumi | 704/232 |
| 5,548,681 | 8/1996 | Gleaves et al. | 704/233 |
| 5,577,164 | 11/1996 | Kaneko et al. | 704/275 |
| 5,577,165 | 11/1996 | Takebayashi et al. | 704/275 |
| 5,659,597 | 8/1997 | Bareis et al. | 455/563 |

FOREIGN PATENT DOCUMENTS

| | | |
|---|---|---|
| 62-253093 | 11/1987 | Japan. |
| 6-4097 | 1/1994 | Japan. |
| 6-119476 | 4/1994 | Japan. |

*Primary Examiner*—David R. Hudspeth
*Assistant Examiner*—Tālivaldis Ivars Šmits
*Attorney, Agent, or Firm*—Michael T. Gabrik

[57] ABSTRACT

A technique for improving speech recognition in low-cost, speech interactive devices. This technique calls for implementing a speaker-specific word enrollment and detection unit in parallel with a word detection unit to permit comprehension of spoken commands or messages issued by binary questions when no recognizable words are found. Preferably, specific speaker detection will be based on the speaker's own personal list of words or expression. Other facets include complementing non-specific pre-registered word characteristic information with individual, speaker-specific verbal characteristics to improve recognition in cases where the speaker has unusual speech mannerisms or accent and response alteration in which speaker-specification registration functions are leveraged to provide access and permit changes to a predefined responses table according to user needs and tastes.

11 Claims, 8 Drawing Sheets

| 0 | RESPONSE CONTENT A0 |
| 1 | RESPONSE CONTENT A1 |
| 2 | RESPONSE CONTENT A2 |
| ⋮ | ⋮ |
| 99 | RESPONSE CONTENT A99 |

"OHAYOU"
FROM WORD
DETECTION UNIT 103

FIG.-7C

"KONNICHIWA"
FROM WORD
DETECTION UNIT 32

FIG.-7D

"OYASUMI"
FROM WORD
DETECTION UNIT 32

FIG.-7E

"NANJI"
FROM WORD
DETECTION UNIT 32

| 100 | RESPONSE CONTENT a0 |
|---|---|
| 101 | RESPONSE CONTENT a1 |
| 102 | RESPONSE CONTENT a2 |
|  |  |

*FIG.-10*

INTERACTIVE SPEECH RECOGNITION COMBINING SPEAKER-INDEPENDENT AND SPEAKER-SPECIFIC WORD RECOGNITION, AND HAVING A RESPONSE-CREATION CAPABILITY

BACKGROUND OF THE INVENTION

Cross Reference to Related Applications

This application is related to copending application Ser. No. 08/536,550, filed on Sep. 29, 1995, Attorney's docket no. P2281a, entitled "Interactive Voice Recognition Method And Apparatus Using Affirmative/Negative Content Discrimination", commonly assigned with the present invention. This application is also related to the following copending applications: application Ser. No. 08/641,268, filed Apr. 30, 1996, which is a continuation of application Ser. No. 08/078,027, filed Jun. 18, 1993 now abandoned, entitled "Speech Recognition System"; Application Ser. No. 08/102859, filed Aug. 6, 1993, now U.S. Pat. 5,481,644, issued Jan. 2, 1996, entitled "Speech Recognition Apparatus"; and application Ser. No. 08/485,134, filed Jun. 7, 1995, entitled "Speech Recognition Apparatus Using Neural Network and Learning Method Therefor"; all commonly assigned with the present invention.

1. Field of the Invention

This invention relates generally to speech recognition technology and is particularly concerned with portable, intelligent, interactive devices responsive to non-speaker specific commands or instructions.

2. Description of the Related Art

An example of conventional portable interactive speech recognition equipment is speech recognition toy. For example, the speech recognition toy that was disclosed by the Japanese Laid Open Publication S62-253093 contains a plurality of pre-registered commands that are objects of recognition. The equipment compares the voice signals emitted by the children or others who are playing with the toy to voice signals pre-registered by a specific speaker. If perceived voice happens to match one or more of the pre-registered signals, the equipment generates a predetermined electrical signal corresponding to the matched voice command, and causes the toy to perform specific operations based on the electrical signal.

However, because these toys rely on a particular individual's speaking characteristics (such as intonation, inflection, and accent) captured at a particular point in time and recognize only a prestored vocabulary, they quite frequently fail to recognize words and expressions spoken by another person, and apt not even to tolerate even slight variations in pronunciation by the registered speaker. These limitations typically lead to misrecognition or nonrecognition errors which may frustrate or confuse users of the toy, especially children, which, in turn, leads to disuse once the initial novelty has worn off. Further, speaker and word pre-registration is extremely time-consuming and cumbersome, since every desired expression must be individually registered one-by-one basis prior to use by a new speaker.

One potential solution may be to incorporate into such devices non-specific speech recognition equipment which uses exemplars from a large population of potential speakers (e.g. 200+ individuals). This technology does a much better job in correctly recognizing a wide range of speakers, but it too is limited to a predefined vocabulary. However, unlike speaker-specific recognition equipment, the predefined vocabulary cannot be altered by the user to suit individual needs or tastes. Further, proper implementation of these non-speaker specific techniques for suitably large vocabularies require copious amounts of memory and processing power currently beyond the means of most commercially available personal computers and digital assistants, as typically each pre-registered word, along with every speaker variation thereof, must be consulted in order to determine a match. Accordingly, conventional non-speaker specific recognition simply does not provide a practical recognition solution for the ultra-cost sensitive electronic toy, gaming or appliance markets.

SUMMARY OF THE INVENTION

It is, therefore, an object of the present invention to implement an interactive speech recognition method and apparatus that can perform natural-sounding conversations without increasing the number of pre-registered words or canned responses characterized by conventional canned matching type speech recognition. Moreover, it is a further object of the present invention to incorporate recognition accuracy and features approaching non-specific speaker speech recognition in a device relatively simple in configuration, low in price, easily manufactured, and easily adaptable to suit changing needs and uses. It is yet a further object of the present invention to provide a highly capable, low-cost interactive speech recognition method and apparatus which can be applied to a wide range of devices such as toys, game machines and ordinary electronic devices.

In accordance with these and related objects, the speech recognition technique of the present invention includes: 1) voice analysis, which generates characteristic voice data by analyzing perceived voice; 2) non-specific speaker word detection, which reads the characteristic voice data and outputs detected data corresponding to pre-registered words contained within a word registry; 3) specific-speaker word enrollment that registers standard voice characteristic data for a select number of words spoken by an individual speaker and outputs detected data when these expressions are subsequently detected; 4) speech recognition and dialogue; management, which, based off both non-specific or, specific speaker word detection, reads the detected voice data, comprehends its meaning and determines a corresponding response; 5) voice synthesis, which generates a voice synthesis output based on the determined response; and 6) voice output, which externally outputs the synthesized response.

According to tie preferred embodiments, specific speaker word enrollment outputs word identification data by DP-matching based on the input voice from a specific speaker. It can comprise the following: an initial word enrollment that creates standard patterns by reading characteristic data relative to a specific speaker's prescribed voice input from the voice analysis process; a standard pattern memory process that stores the standard patterns created by the word enrollment process; and a word identification process that outputs word identification data by reading characteristic data relative to the specific-speaker's prescribed voice input and by comparing the characteristic data with said standard patterns. Further, specific speaker word enrollment comprises at least the following: additional word enrollment that creates standard voice patterns that are speaker-adapted based on the standard characteristic voice data for non-specific speakers as spoken by the selected speaker along with speaker-adapted standard pattern memory for storing both the standard patterns that are speaker-adapted and those installed by speaker specific word enrollment. Moreover, specific speaker word enrollment may read characteristic data relative to the specific speaker's prescribed voice input through voice analysis and outputs word identification by comparing the input characteristic data with the speaker-adapted standard patterns.

Further, the preferred embodiments may include a response creation function. When a particular speaker wishes to add to or modify the existing response list, the preferred embodiment can create response data based on voice signals that have been input by a particular speaker and register them according to instructions given by speech recognition and dialogue management. This permits the creation of new and useful response messages using the voices of a wide variety of people and allows a wide variety of exchanges between the embodiment and users.

Thus, the present invention couples simple non-specific speaker speech recognition with specific speaker expression registration and detection. Further, non-specific pre-registered words can be speaker-adapted to permit more accurate and quicker recognition. In certain situations, some words are recognized and other words are not depending on the manner in which a particular speaker utters them. With some speakers, no non-specific pre-registered words can be recognized at all. In such cases, words that fail to be recognized can be registered using a specific-speaker voice registration function. This virtually eliminates words that cannot be recognized and thus substantially improves the overall recognition capability of the equipment. This function also allows specific speakers to register new words suited to the user's individual needs and tastes which are not included in the non-specific word registry.

Further, the preferred embodiments may include a response creation function which permits alteration or additions to a predefined response list, thereby improving its depth and range of usefulness.

Other objects and attainments together with a fuller understanding of the invention will become apparent and appreciated by referring to the following description of the presently preferred embodiments and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

As depicted in the figures, the presently preferred embodiments exemplify speech recognition techniques of the present invention as applied to an inexpensive voice-based toy, gaming device, or similar interactive appliance. Though an ordinary skill in the speech recognition art will recognize that the teachings of the present invention are not so limited, the presently preferred embodiments can be conveniently implemented as a standalone speech recognition device residing within a stuffed doll such as dog, cat or bear suitable for young children.

Figure 1:
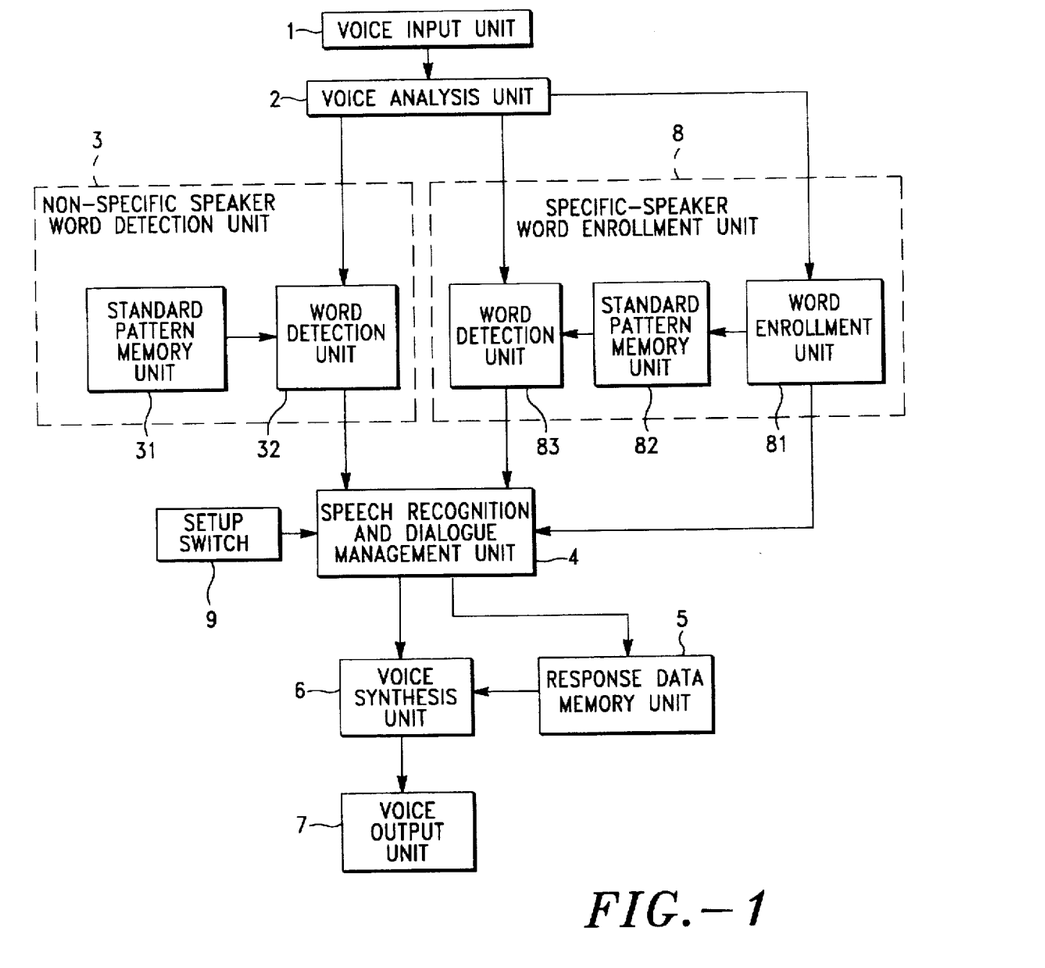
FIG. 1 is an overall block diagram of the first preferred embodiment.

FIG. 1 shows a configuration diagram that depicts the first preferred embodiment of the present invention. In FIG. 1, the following components are designed to recognize words spoken by non-specific speakers and to generate response messages according to the results of the recognition: voice input unit 1, which inputs the speaker's voice; voice analysis unit 2, which outputs characteristic voice data by analyzing the input voice; non-specific speaker word detection unit 3, which reads the characteristic voice data from voice analysis unit 2 and outputs the detected data corresponding to the registered words contained in the input voice, based on a non-specific speaker's standard characteristic voice data relative to pre-registered recognizable words; speech recognition and dialogue; management unit 4; response data memory unit 5, which stores pre-set response data; voice synthesis unit 6; and voice output unit 7. Also shown in FIG. 1, a specific-speaker word enrollment means 8 is provided that registers the standard characteristic voice data on the words uttered by a specific speaker based on the specific speaker's input voice and that outputs word identification data on the specific speaker's input voice. Further, setup switch 9 is provided to serve as a data input setup means for performing various data input setup actions by an individual user.

The non-specific speaker word detection unit 3 preferably comprises the following: standard pattern memory unit 31, which stores standard voice vector patterns or standard characteristic voice data that correspond to each pre-registered word contained in the word registry; and word detection unit 32, which generates word identification data preferably in the form of a word lattice by reading characteristic voice data from voice analysis unit 2 and by comparing them against the standard non-specific speakers patterns contained in the standard pattern memory unit 31.

The standard pattern memory unit 31 stores (registers) standard patterns of target-of-recognition words that are created beforehand using the voices of a large number of speakers (e.g., 200 people) for each of the words. Since these embodiments are directed to a low-cost toy or novelty, approximately 10 words are chosen as target-of-recognition words. Although the words used in the embodiment are mostly greeting words such as the Japanese words "ohayou" meaning "good morning", "oyasumi" meaning "good night", and "konnichiwa" meaning "good afternoon", the present invention is, of course, by no means limited to these words or to merely the Japanese language. In fact, various words in English, French or other language can be registered, and the number of registered words is not limited to 10. Though not shown in FIG. 1, word detection unit 32 is principally composed of a processor (the CPU) and ROM that stores the processing program. Its function is to determine on what confidence level the words registered in standard pattern memory unit 31 occur in the input voice, and will be described in more detail hereinbelow.

On the other hand, specific-speaker word enrollment unit 8 preferably comprises the following: word enrollment unit 81; standard pattern memory unit 82, which stores input voice standard patterns as the standard characteristic voice data on the input voice; and word detection unit 83. In this embodiment, the specific-speaker word unit enrollment the words uttered by specific speakers by entering their voice signals and outputting the detected data in the form of a word lattice for specific-speaker registered words relative to the input voice. In this example, it is assumed that the input voice is compared with registered standard voice patterns by DP-matching, and word identification data is output from word detection unit 83 based on the results of the comparison. The enrollment of words by specific-speaker word enrollment unit 8 can be performed by setting the word enrollment mode using setup switch 9, as will be discussed in greater detail hereinbelow.

Still referring to FIG. 1, voice input unit 1 is composed of the following conventional sub-components which are not shown in the figure: a microphone, an amplifier, a low-pass filter, an A/D converter, and so forth. The voice which is input from the microphone is converted into an appropriate audio waveform after the voice is allowed to pass through the amplifier and the low-pass filter. The audio waveform is then converted into digital signals (e.g., 12 KHz sampling rate at 16 bit resolution) by the A/D converter and is output to voice analysis unit 2. Voice analysis unit 2 takes the audio waveform signals transmitted from voice input unit 1 and uses a processor (the CPU) to perform a frequency analysis at short time intervals, extracts characteristic vectors (commonly LPC-Cepstrum coefficients) of several dimensions that express the characteristic of the frequency, and outputs the time series of the characteristic vectors (hereinafter referred to as "characteristic voice vector series"). It should be noted that said non-specific speaker word data output means 3 can be implemented using the hidden Markov model (HMM) method or the DP-matching method. However, in this example keyword-spotting processing technology using the dynamic recurrent neural network (DRNN) method is used as disclosed by Applicants in U.S. application Ser. No. 08/078,027, filed Jun. 18, 1993, entitled "Speech Recognition System", commonly assigned with the present invention to Seiko-Epson Corporation of Tokyo, Japan, which is incorporated fully herein by reference. Also, this method is disclosed in the counterpart laid open Japanese applications H6-4097 and H6-119476. DRNN is preferably used in order to perform speech recognition of virtually continuous speech by non-specific speakers and to output word identification data as described herein.

Figure 2A:
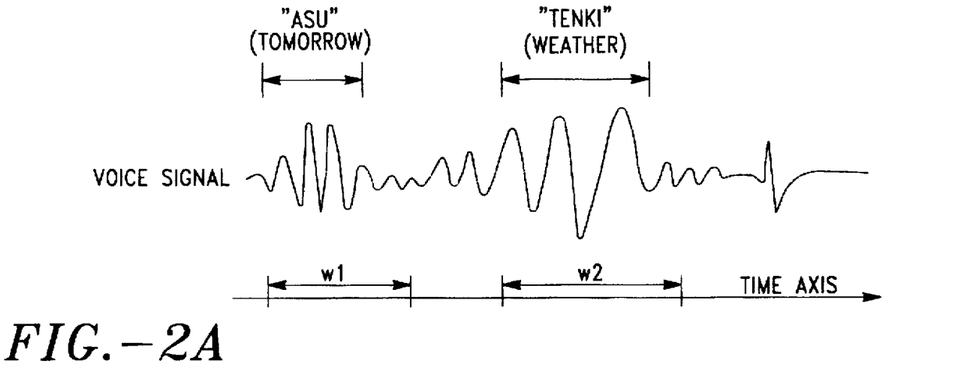
FIGS. 2A–2E diagrammatically illustrate a sample input voice waveform and resultant word lattice generated by the non-specific speaker word detection unit of the embodiment shown in FIG. 1.

The following is a brief explanation of the specific processing performed by non-specific speaker word data detection unit 3 with reference to FIGS. 2A–2E. Word detection unit 32 determines the confidence level at which a word registered in standard pattern memory unit 31 occurs at a specific location in the input voice. Now, suppose that the speaker inputs an example Japanese language phrase "asu no tenki wa . . . " meaning "Concerning tomorrow's weather". Assume that in this case the stylized voice signal shown in FIG. 2A represents the audio waveform for this expression.

In the expression "asu no tenki wa . . . ", the contextual keywords include "asu" (tomorrow) and "tenki" (weather). These are stored in the form of patterns in standard pattern memory unit 31 as parts of the a predetermined word registry, which in this case, represents approximately 10. If 10 words are registered, signals are output in order to detect words corresponding to these 10 words (designated word 1, word 2, word 3 . . . up to word 10). From the information such as detected signal values, the word detection unit determines the confidence level at which the corresponding words occur in the input voice.

Figure 2B:
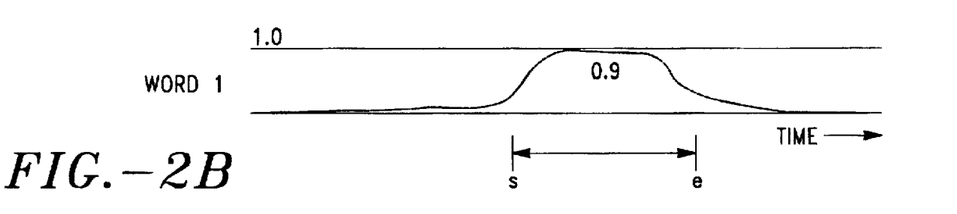
Figure 2C:
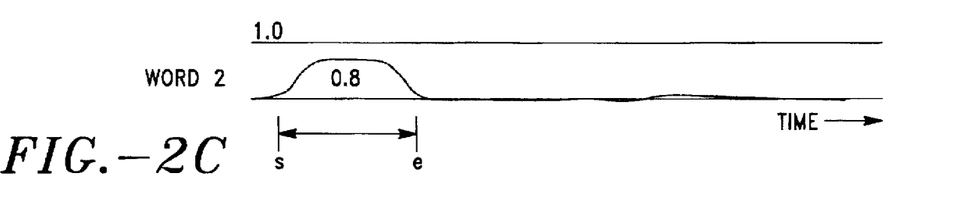
Figure 2D:
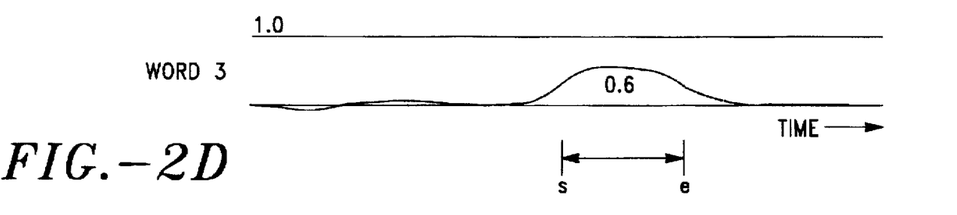
Figure 2E:
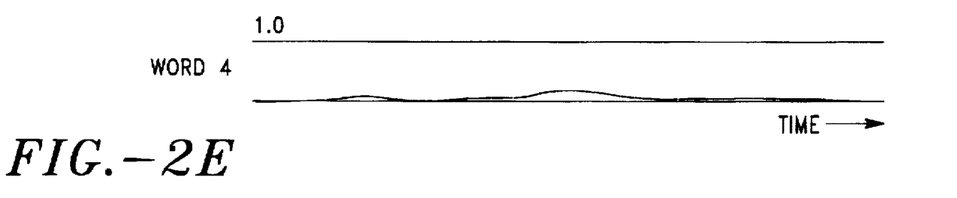

More specifically, if the word "tenki" (weather) occurs in the input voice as word 1, the detection signal that is waiting for the signal "tenki" (weather) rises at the portion "tenki" in the input voice, as shown in FIG. 2B. Similarly, if the word "asu" (tomorrow) occurs in the input voice as word 2, the detection signal that is waiting for the signal "asu" rises at the portion "asu" in the input voice, as shown in FIG. 2C. In FIGS. 2B and 2C, the numerical values 0.9 and 0.8 indicate respective confidence levels that the spoken voice contains the particular pre-registered keyword. The relative level or magnitude of this level can fluctuate between~0 and 1.0, with 0 indicating a nearly zero confidence match factor and 1.0 representing a 100% confidence match factor. In the case of a high confidence level, such as 0.9 or 0.8, the registered word having a high confidence level can be considered to be a recognition candidate relative to the input voice. Thus, the registered word "asu" occurs with a confidence level of 0.8 at position w1 on the time axis. Similarly, the registered word "tenki" occurs with a confidence level of 0.9 at position w2 on the time axis.

Also, the example of FIGS. 2A–2E show that, when the word "tenki" (weather) is input, the signal that is waiting for word 3 (word 3 is assumed to be the registered word "nanji" ("What time . . . ") also rises at position w2 on the time axis with an uncertain confidence level of approximately 0.6. Thus, if two or more registered words exist as recognition candidates at the same time relative to an input voice signal, the recognition candidate word is determined by one of two methods: either by 1)selecting the potential recognition candidate with the highest degree of similarity to the input voice using confidence level comparisons as the actually recognized keyword; or a method of selecting one of the words as the recognized word by creating beforehand a correlation table expressing correlation rules between words. In this case, the confidence level for "tenki" (weather) indicates that it has the highest degree of similarity to the input voice during time portion w2 on the time axis even though "nanji" can be recognized as a potential recognition candidate. Based on these confidence levels, the speech recognition and dialogue management unit 4 performs the recognition of input voices.

Collectively, the detection information, including starting and ending points on the time axis and the maximum magnitude of the detection signal indicating the confidence level, for each pre-registered word contained in non-specific speaker word registry within standard pattern memory unit 31 is known as a word lattice. In FIGS. 2B–2E, only a partial lattice is shown for the sake of clarity, but a word lattice including detection information for every pre-registered non-specific word is in fact generated by the word detection unit 32.

Though not shown in FIG. 1, speech recognition and dialogue management unit 4 is principally composed of a processor and ROM that stores the processing program and performs the processing tasks described below. Different CPUs may be provided in the individual units or, alternatively, one CPU can perform the processing tasks for the different units.

Speech recognition and dialogue management unit 4 selects a recognition word output from either non-specific word detection unit 32 or specific speaker word detection unit 83. Based on the composite word lattice, the speech recognition and dialogue management unit recognizes a voice (comprehending the overall meaning of the input voice), references response data memory unit 5, determines a response according to the comprehended meaning of the input voice, and transmits appropriate response information and control overhead to both voice synthesis unit 8 and voice output unit 9.

For example, when the detected data or partial word lattice shown in FIGS. 2B–2E is relayed from word detection unit 32, the speech recognition and dialogue management unit determines one or more potential recognition candidates denoted in the word lattice as a keyword occurring in the input. In this particular example, since the input voice is "asu no tenki wa" (the weather tomorrow), the words "asu" (tomorrow) and "tenki" (weather) are detected. From the keywords "asu" and "tenki", the speech recognition and dialogue management unit understands the contents of the continuous input voice "asu no tenki wa".

The speech recognition processing of virtually continuous voice by keyword spotting processing, as described above, is applicable to other languages as well as to Japanese. If the language to be used is English, for instance, some of the recognizable words that can be registered might be "good morning", "time", "tomorrow", and "good night". The characteristic data on these recognizable registered words is stored in standard memory unit 31. If the speaker asks "What time is it now?", the word "time" in the clause "what time is it now" is used as a keyword in this case. When the word "time" occurs in the input voice, the detection signal that is waiting for the word "time" rises at the portion "time" in the input voice. When detected data (word lattice) from word detection unit 32 is input, one or more words in the input voice is determined as a keyword. Since in this example the input voice is "what time is it now", "time" is detected as a keyword, and the speech recognition and dialogue management unit understands the contents of the continuous input voice "what time is it now?"

The above description concerns the case where word data is output from nonspecific speaker word data output means 3, i.e., the words spoken by the speaker are recognized. With some speakers, however, words like the Japanese expression "ohayou" (good morning) totally fail to be recognized. Although in some cases changing the way words are spoken can solve the problem, some speakers with voice idiosyncrasies entirely fail to be recognized. In such cases, the words that fail to be recognized can be registered as specific-speaker words. This feature is described below.

Figure 3:
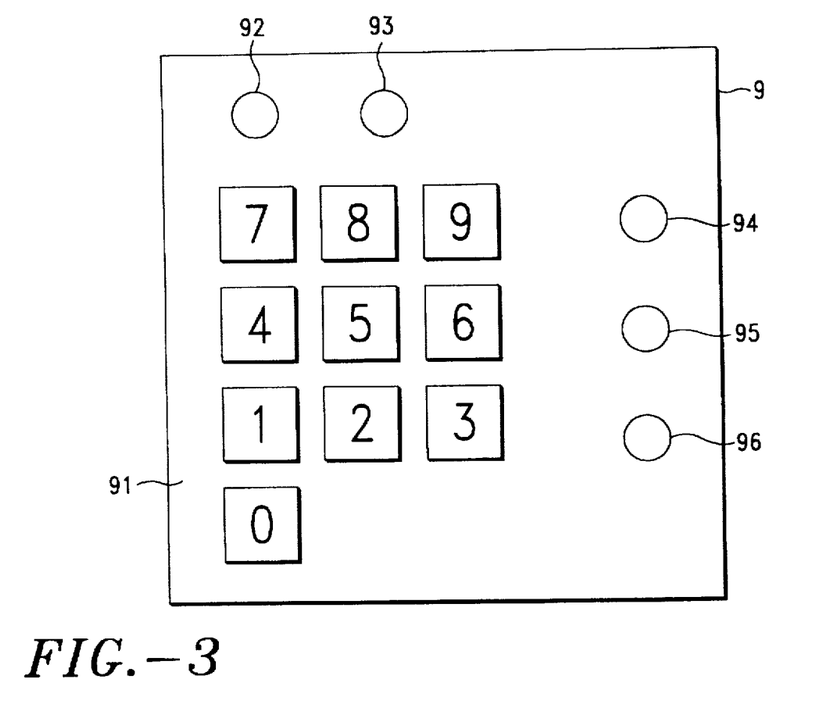
FIG. 3 illustrates an example setup switch according to the first and second preferred embodiments.
Figure 4A:
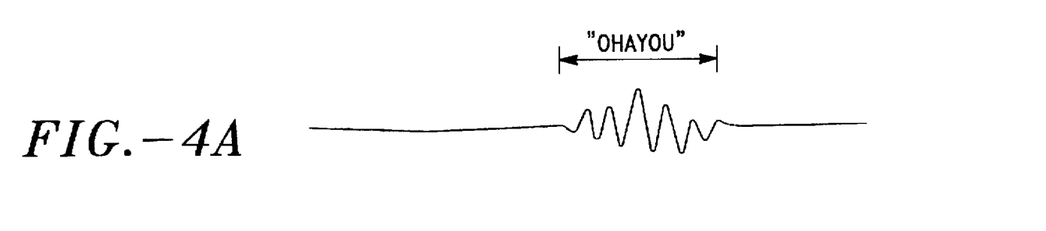
FIGS. 4A–4E diagrammatically illustrate another sample input voice waveform and resultant word lattice generated by the non-specific speaker word detection unit of the embodiment shown in FIG. 1.
Figure 4B:
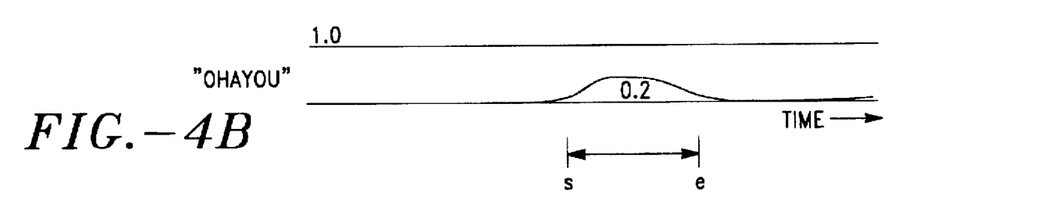
Figure 4C:
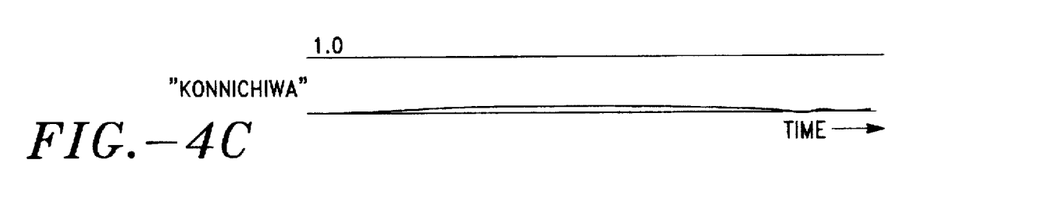
Figure 4D:
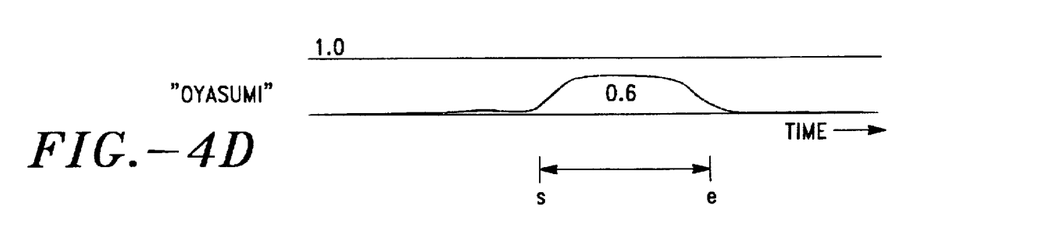
Figure 4E:
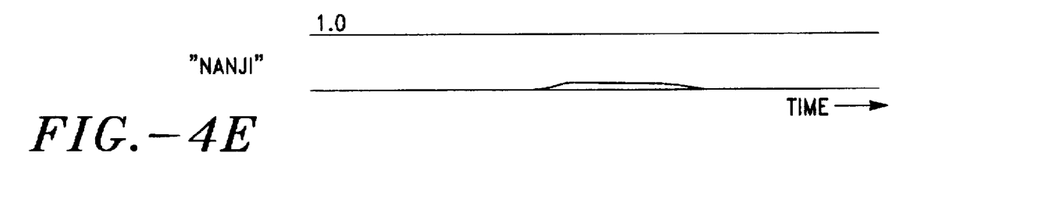

Referring still to FIG. 1, setup switch 9 is used to register specific-speaker words. As shown in FIG. 3, setup switch 9 preferably comprises number key unit 91, start-of-registration button 92, end-of-registration button 93, response message selection button 94, end-of-response message registration button 95, and response number input button 96. Buttons such as response message selection button 94, end-of-response message registration button 95, and response number input button 96 will be described in more detail hereinbelow.

By means of example, this section explains the case where the word "ohayou" (good morning) is registered as a specific-speaker word because it is not recognized. First, start-of-registration button 92 on setup switch 9 is pushed. This button operation speech recognition and dialogue management; unit 4 to enter into specific-speaker word enrollment mode. Normal recognition operations are not performed in this word enrollment mode.

Suppose that the speaker enters the number for the word "ohayou" (good morning) (each registered word that is known to be recognizable is preferably assigned a number) from number key unit 91, and "ohayou" (good morning) is number 1, for example. Then, when the speaker presses the numeric key "1" speech recognition and dialogue management unit 4 detects that the speaker is trying to register the word "ohayou" (good morning) and performs controls so that the unit outputs a response "Say 'good morning'". When the speaker says "ohayou" (good morning) because of this prompt, his voice is transmitted from voice input unit 1 to voice analysis unit 2. The characteristic vector that has been voice-analyzed is transmitted to word enrollment unit 81. Word enrollment unit 81 creates standard patterns for the input voice as standard characteristic voice data. The standard pattern is then stored in standard pattern memory unit 82.

The characteristic pattern that is registered as described above can be a standard pattern that uses the characteristic vector column of the word "ohayou" (good morning) exactly as uttered by the speaker. Alternatively, the speaker can say "ohayou" (good morning) several times, and the average standard characteristic vector column of the individual characteristic vector columns can be obtained, and a standard pattern can be created from the standard characteristic vector column.

In this manner, words that are uttered by a specific speaker and that cannot be recognized can be registered. Naturally, the registration technique can be performed on all unrecognizable words, not just "ohayou" (good morning). It is in this manner that the registration of specific-speaker words from unrecognizable words is performed.

The following describes specific examples of conversations between a speaker and the first preferred embodiment. In the speaker's utterances, the words enclosed in brackets indicate keywords used for character recognition.

Suppose that the speaker says "[ohayou] gozaimasu" meaning "[Good morning] to you . . . ". The voice "ohayou" is transmitted from voice input unit 1 to voice analysis unit 2, where a voice-analyzed characteristic vector is generated. At this time, word detection unit 32 of non-specific speaker word detection unit 3 and word detection unit 83 of specific speaker word data output unit 8 are both waiting for a signal from voice analysis unit 2. Word detection units 32 and 83 each outputs word detection data in the form of the aforementioned word lattice that corresponds to the output from voice analysis unit 2. However, the numeric value indicating a degree of confidence contained in the word lattice from word detection unit 83 corresponds a deviation value rather than a degree of similarity.

It should be noted here that the numeric value indicating a degree of confidence contained in the word lattices from word detection unit 32 indicates a degree of similarity to a particular non-speaker specific pre-registered word, such as 0.9 or 0.7, in the case of word detection unit 32, as explained hereinabove with reference to FIGS. 2A–2E. The higher the numerical value, the higher the level of confidence. On the other hand, in the case of word detection unit 83, the numeric value indicates the deviation between the characteristic and the standard patterns of the input voice. Therefore, the smaller the numeric value, the greater the level of confidence that a match has been made. Consequently, when receiving a word lattice from word detection units 32 or 83, speech recognition and dialogue management unit 4 compares each degree of similarity and deviation with respective threshold values th1 and th2 (assume that th1=0.7, th2=0.3) in order to determine potential recognition candidates.

Suppose that when the word "tenki" (weather) is input, word detection unit 32 generates the signal that detects "tenki" with the high degree of similarity of 0.9, as shown in FIG. 2B, the value 0.9 and threshold value th1 (th1=0.7), and if the former is greater than th1, the input voice is recognized to be "tenki".

If the speaker utters the word "ohayou" (good morning), which is registered as a specific-speaker word, word detection unit 32 generates the word lattice shown in FIGS. 4A–4E, for example. In this case, the degree of similarity between the detection signal for detecting a non-speaker specific "ohayou" (good morning) relative to the speaker's "ohayou" (good morning) is a low 0.2. Consequently higher degrees of similarity can sometimes occur in the detection words for detecting other words. In this case, a relatively high degree of similarity (0.6) appears for the non-speaker specific word detection process that is waiting for "oyasumi" (good night).

Word detection unit 83 generates the deviation value that is obtained by comparing the voice signal representing the speaker's "ohayou" (good morning) and a standard pattern stored in standard pattern memory unit 82. Assume that this deviation is extremely small, such as 0.1, for example.

Speech recognition and dialogue management unit 4 determines one or more actual recognition candidates after receiving word lattices from respective word detection units 32 and 83. In this case, speech recognition and dialogue management unit 4 knows which words in the registered fiords are specific-speaker registered words (from the fact that word numbers are entered when the speaker registers the words). Therefore, instead of treating the detection signal for detecting "ohayou" as a recognition target in the word lattice from word detection unit 32, the speech recognition dialogue management unit uses the identification data shown in FIGS. 4B–4E to compare it with the word lattice from word detection unit 83 (not shown). It should be noted that, although in FIGS. 4A–4E, identification data values for only four words are shown, in actuality the complete word lattice for all non-specific registered words may be input into speech recognition and dialogue management unit 4, as well. Assume that, of all identification data for the non-speaker specific registered words for the speaker's "ohayou", the highest degree of similarity occurs for "oyasumi" (good night).

Thus, speech recognition and dialogue management unit 4 compares degrees of similarity and deviation values from word detection units 32 and 83 with respective threshold values (th1=0.7, th2=0.3), determines recognition candidates, and comprehends the meaning of the input voice. In this case, the highest degree of similarity received from word detection unit 32 is 0.6, which is less than threshold value th1. On the other hand, the deviation for the input voice "ohayou" from word detection unit 83 is 0.1, which is less than threshold value th2. Therefore, in this case "ohayou" is determined to be the recognition candidate.

If the highest degree of similarity received from word detection unit 32 is greater than threshold value th1 and the distance value received from word detection unit 83 is less than threshold value th2, some rules should be established beforehand so that either one or the other is determined as a recognition candidate. An example might be to give priority to the data from word detection unit 83 so that it is the recognition candidate, or a response message. Another example might be to generate a response that prompts a re-input from the device side.

Recognition words are determined in response to a speaker's voice input as described above. Moreover, because unrecognizable words (registered words) can be registered as specific-speaker words, the problem of registered words not being recognized can be eliminated. When a recognition word is determined, speech recognition conversation control unit 4 comprehends the meaning of the input voice, determines a response, and outputs the response from voice output unit 7. In this case, a fluctuation data detection unit that detects fluctuation data such as time, date, pressure, and temperature, as well as a memory units that store these data, can be provided. Based on these data, wide-ranging response data can be created. For example, if the speaker says "ohayou" (good morning), the stuffed doll might be able to respond by saying, "Good morning, because it is so nice (from the pressure information), let's go to see the cherry blossoms" (from the date information). In such a conversation, the stuffed doll's response to the speaker's words can be pre-registered in correspondence to the contents of the speaker's words.

The above has been an explanation of how to register specific-speaker words when some words cannot be recognized due to a speaker's idiosyncrasies and how to generate response messages by recognizing such words. In addition, words other than registered words can also be registered as specific-speaker words. In the case of a stuffed doll implementing one of the preferred embodiments, for example, a unique name can be assigned to it and the name can be registered. The following describes how to register the name of an example stuffed doll.

Referring to FIG. 3, the numeric key "0" on number key 91 on setup switch 9 can be designated as the name registration key. In this case, first press start-of-registration button 92, and then press the numeric key "0". This causes the device to generate a message "What is your name?". If the speaker says "Doggie", the name is stored. This is done basically in the same way as storing unrecognized registered words as described above. For example, the speaker can utter "Doggie" several times. A standard pattern is determined from the average characteristic vector column and the results are stored in standard pattern memory unit 82. For the name "Doggie", a response "Bow wow" can be stored beforehand. This enables the device to response "Bow wow" whenever a speaker calls the name "Doggie".

Speaker-specific words can also be stored and response messages can be created for the registered words (with some limitations on the contents of the responses). In this case, an operating procedure manual can be prepared, and response messages can be created by performing the operations according to the manual. This is explained more fully in the following paragraphs.

Figure 5:
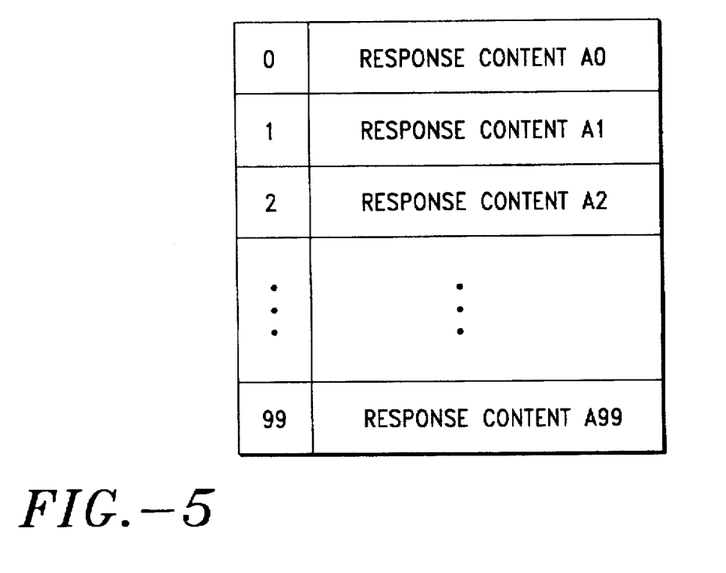
FIG. 5 shows a example response table stored in the response data memory unit of the embodiment shown in FIG. 1.

To implement the above scheme about 100 responses, for example, can be prepared on the device side so that a response is selected according to a word stored specifically by the speaker. In concrete terms, response content numbers 0, 1, 2, . . . can be assigned to response contents such as response content A0, response content A1, response content A2, . . . . This information is preferably stored in response data memory unit 5. An operating manual that provides a correspondence table between these response content numbers and the response contents is prepared, and the user sets the response contents for each registered word by following the operating manual and viewing the table. This setting is performed using setup switch 9 as follows:

According to this embodiment, numeric values greater than or equal to "11" are used on number key 91 for the registration of previously unregistered words in order to register words. (It should be noted that the numeric value "0" in this embodiment is used to register names, and the numeric values "1" through "10" are associated with the registered words. These numbers are used to register specific-speaker words when registered words fail to be recognized.) First, press start-of-registration button 92. Then, using number key 91, enter "11", for example. When an expression is voice-input, the standard voice pattern for the expression is stored in standard voice pattern memory unit 82 of the specific speaker word enrollment unit 8. Next, operate response message selection button 94 to select from the response table, the response content appropriate for the registered word. For example to register response content A1 for response content number 1, press response content number input button 96, then press the numeric key "1" that corresponds to response content number 1 on number key 91, and lastly press end-of-response message registration button 95. This ensures that the device generates a response according to response content A1 when the speaker inputs as a voice input the word that was registered by pressing the numeric value key "11".

Thus, by using setup switch 9 and numeric values greater than or equal to "11", the user can register user-specific words, and can select and register response contents that are associated with the words that are registered. Further, by combining response content numbers, a wide variety of response contents can be created and registered such as response content A0, response content A2, and response content A4.

The first preferred embodiment described above illustrates an example where a standard pattern was created using a characteristic vector that was generated by the voice analysis of a speaker's voice input, and word identification data (word lattice) was output by comparing the standard pattern with the input voice in order to perform word detection on unrecognizable words by means of DP-matching. By contrast, the second preferred embodiment seeks to perform recognition operations by performing a speaker adaptation using a non-specific-speaker standard pattern model, creating speaker-adapted standard characteristic patterns, and using the new speaker-adapted standard patterns.

Figure 6:
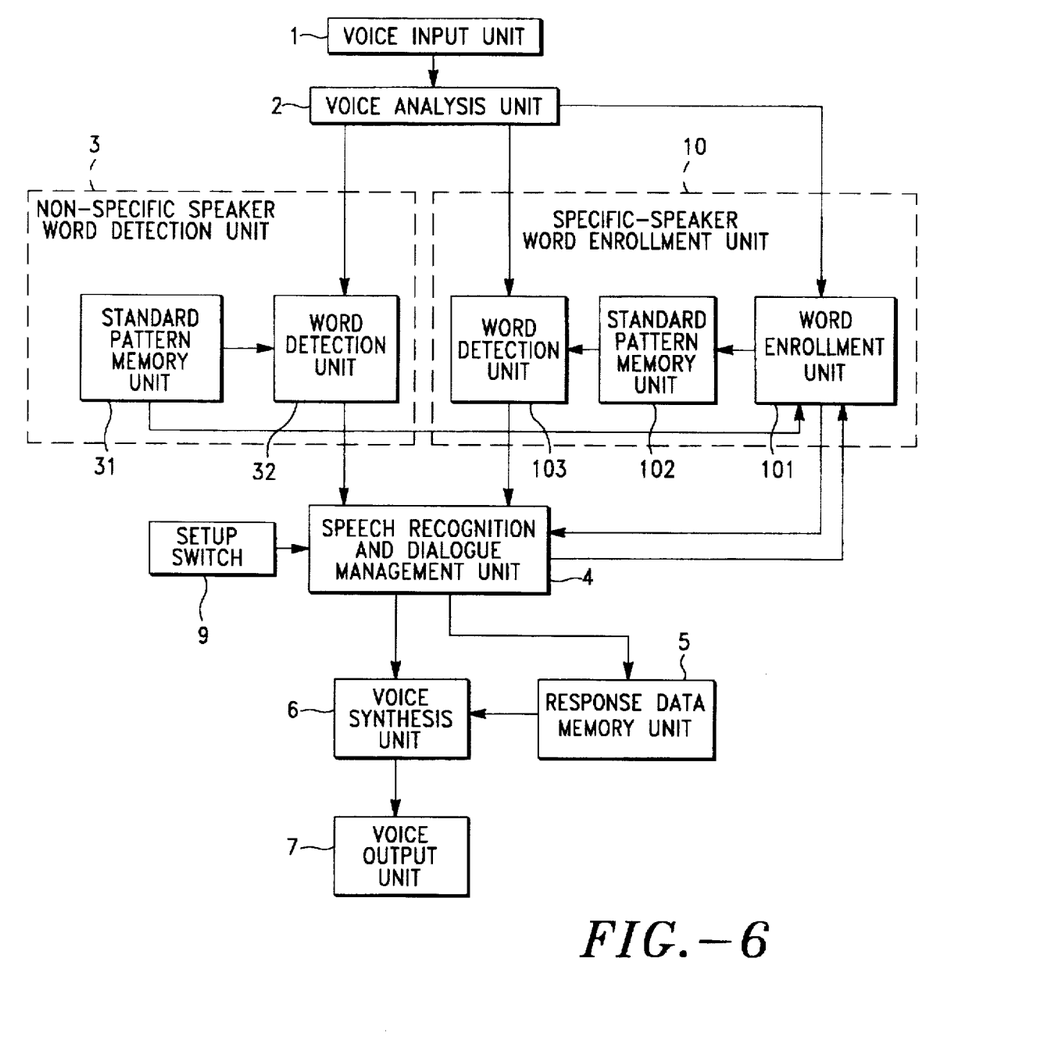
FIG. 6 is an overall block diagram of a second preferred embodiment.

Referring now to FIG. 6, items in FIG. 6 that are identical to those in FIG. 1 are assigned the same indicating numerals. As shown in this figure, the second preferred embodiment comprises the following: voice input unit 1, voice analysis unit 2, non-specific speaker word detection unit 3 (standard pattern memory unit 31, word unit 32, speech recognition and dialogue management; and unit 4, response data memory unit 5, voice synthesis unit 6, and setup switch 9. In addition, this embodiment is provided with the following components: specific-speaker word enrollment unit 10 which includes word enrollment unit 101 that generates speaker-adapted standard patterns using the non-specific-speaker standard pattern model of the DRNN based on the input voice (output from voice analysis unit 2) of a specific speaker; speaker-adapted standard pattern memory unit 102, which stores the new speaker-adapted standard patterns that are generated in word registration unit 101; and word identification unit 103, which outputs word detection data (word lattice) based on said speaker-adapted standard pattern memory unit 102 and by receiving the output from voice analysis unit 2.

Because this embodiment operates identically with the first preferred embodiment in cases where a speaker's words are recognized, this section need only explain the recognition processing that is performed by the second preferred embodiment when encountering words that fail to be recognized through word detection.

As in the case of the first preferred embodiment, if the word voice "ohayou" (good morning) uttered by the speaker is not recognized, the word "ohayou" (good morning) is registered as a speaker-specific word as follows:

Setup switch 9 is used to register a speaker-specific word as shown in FIG. 3. First, operate on start-of-registration button 92 on setup switch 9. This causes speech recognition and dialogue management; and unit 4 to activate the word enrollment mode. Normal recognition operations are not performed in this mode.

If the speaker presses the numeric key "1" assigned to the word "ohayou" (good morning), speech recognition and dialogue management; and unit 4 detects that the operation called Nor is the registration of the word "ohayou" (good morning), and performs controls so that a response "Say 'good morning'" is generated. When the speaker says "ohayou" (good morning) because of this action, the resulting voice is transmitted from voice input unit 1 to voice analysis unit 2. A voice-analyzed characteristic vector is then transmitted to word enrollment unit 101. Based on the output from voice analysis unit 2, word enrollment unit 101 creates a new standard pattern that matches the speaker's voice characteristics from the DRNN standard pattern, i.e., the speaker-adapted standard pattern, and stores the new standard pattern in speaker-adapted standard pattern memory unit 102.

Figure 7A:
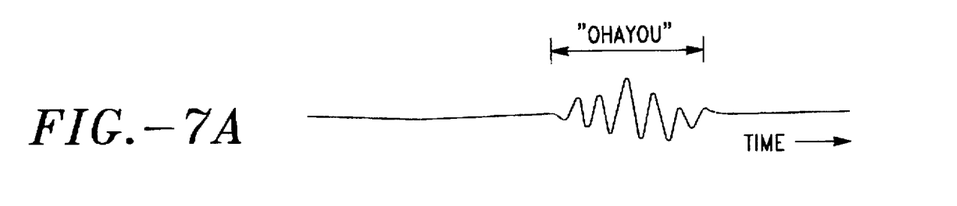
FIGS. 7A–7E diagrammatically illustrate a sample input voice waveform and resultant word lattice generated by both the specific and non-specific speaker word detection units of the embodiment shown in FIG. 6.
Figure 7B:
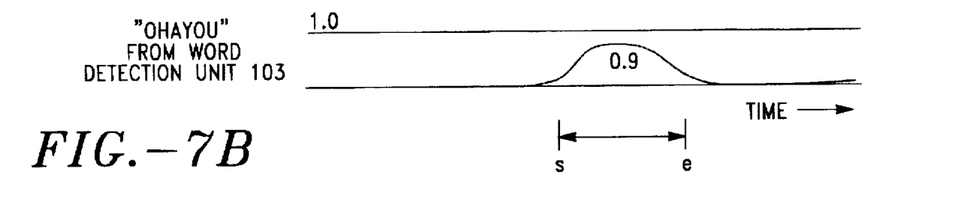
Figure 7C:
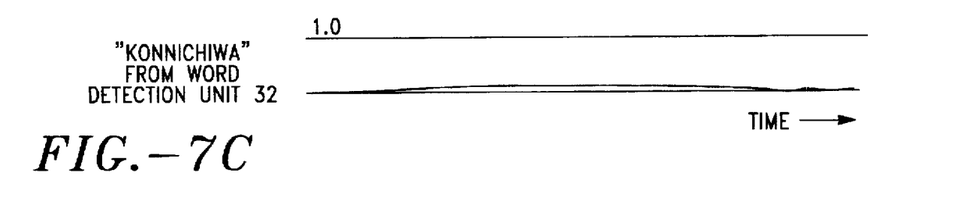
Figure 7D:
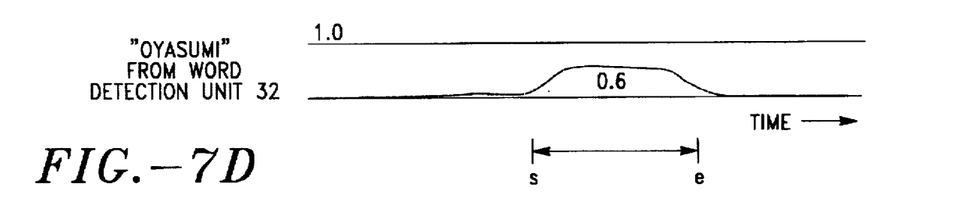
Figure 7E:
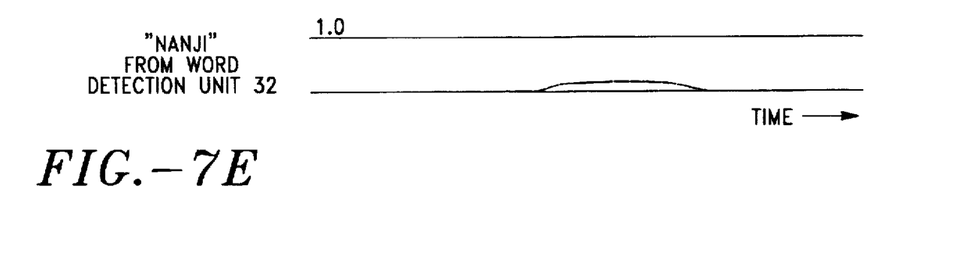

If the speaker utters the speaker-specific registered word "ohayou" (good morning), word detection unit 32 outputs the word lattice shown in FIGS. 4A–4E, as explained in embodiment 1. In this case, the degree of similarity of the detection signal for detecting the word "ohayou" relative to the speaker's "ohayou" is low. Therefore, high degrees of similarity may occur in the detection signals for detecting other words. Suppose now that the signal waiting for the word "oyasumi" (good night) has a relatively high degree of similarity (0.6). On the other hand, the signal for detecting "ohayou" from word detection unit 103 is output with a high degree of similarity as shown in FIG. 7B. This is because the output is produced as a result of a comparison between a speaker-adapted "ohayou" standard pattern and the input voice "ohayou" of the speaker. Note, here, that the speaker-specific word detection unit 10 generates confidence level information according to degree of similarity instead of deviation information, as in the case of the first preferred embodiment.

Speech recognition and dialogue management unit 4 determines a recognition candidate after receiving word lattices from word detection units 32 and 103. In this case, speech recognition and dialogue management unit 4 knows which words in the registered words are specific-speaker registered words (from the fact that word numbers are entered when the speaker registers the words). Therefore, instead of treating "oyasumi" as the sole potential recognition candidate for detecting "ohayou" in the word lattice from word detection unit 32, the voice recognition and dialogue management unit additionally us the detection data shown in FIG. 7B and compares the word lattices from word identification unit 103 and word detection unit 32. Although in FIGS. 7A–7E, detection data values from word detection unit 32 for only three words are shown, in actuality the word lattice for other non-specific speaker pre-registered words are also input into speech recognition and dialogue management unit 4.

Thus speech recognition and dialogue management unit 4 compares the degrees of similarity obtained from word detection units 32 and 103, determines the recognition candidate, and comprehends the meaning of the input voice. In this case, the highest degree of similarity obtained from word detection unit 32 is 0.6 for "oyasumi" (good night). By contrast, the degree of similarity for "ohayou" from word detection unit 103 is 0.9. Therefore, "ohayou" is determined to be the recognition candidate.

If the word lattices received from word detection units 32 and 103 indicate several words with high degrees of similarity, several methods for determining the recognition candidate exist. In one method, the word with the highest degree of similarity is determined as the recognition candidate. In another method, a correlation table is created for each word indicating the correlation between the degrees of similarity of the words, and the recognition candidate is determined based upon this correlation table, as discussed previously hereinabove.

FIG. 6 shows that word detection unit 32 and word detection unit 103 are provided separately as word detection units. However, because a speaker-adaptation using a DRNN-based standard pattern is used for registering specific-speaker words, the baseline for the numerical values contained in the word lattices is the same. Therefore, word detection unit 32 can double as word detection unit 103, and can be conveniently implemented as is known to those ordinarily skilled in the art.

Recognition words are determined in response to a speaker's voice input as described above. Moreover, because unrecognizable words (registered words) can be registered as specific-speaker words, the problem of registered words not being recognized can be eliminated. Furthermore, previously registered standard patterns with poor recognition rates can be replaced by speaker-adapted standard pattern for registering speaker-specific words.

When a recognition word is determined, speech recognition and dialogue management control unit 4 comprehends the meaning of the input voice, determines a response, and outputs the response from voice output unit 7. In this case, though not shown in the figure, a fluctuation data detection unit that detects fluctuation data such as time, date, pressure, and temperature, as well as a memory units that stores these data can be provided. Based on these data, wide-ranging response data can be created. For example, if the speaker says "ohayou" (good morning), the stuffed doll might be able to respond by saying, "Good morning, because it is so nice (from the pressure information), let's go to see the cherry blossoms (from the date information)". In such a conversation the stuffed doll's response to the speaker's words can be pre-registered in correspondence to the contents of the speaker's words.

In preferred embodiments 1 and 2 described above, response messages are prepared and stored on a pre-set basis using actors. By contrast, the third preferred embodiment allows the user to create responses using his own voice, the mother's voice, and friends'voices. This is explained with reference to FIG. 8.

Figure 8:
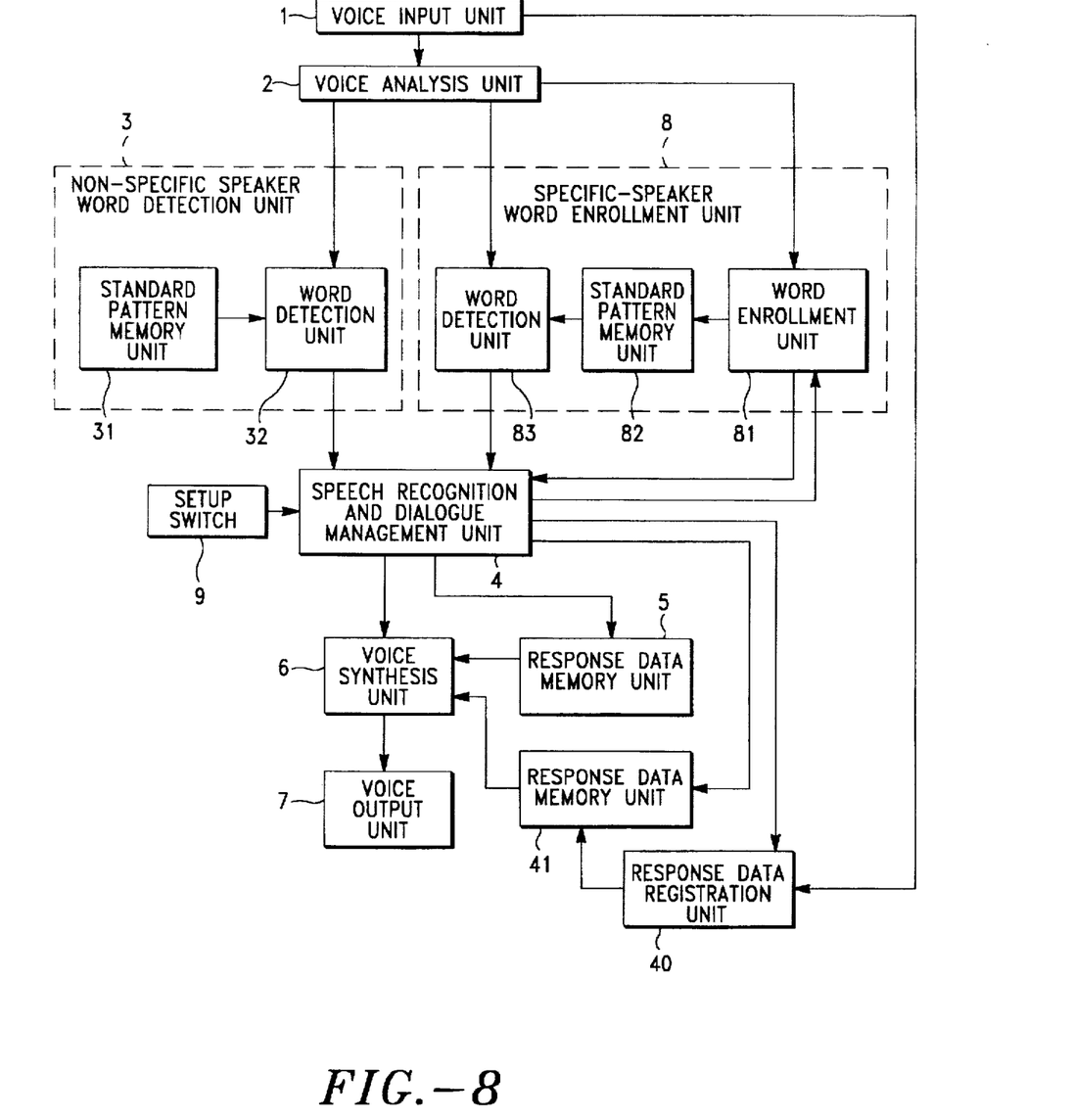
FIG. 8 is an overall block diagram of a third preferred embodiment.

The items in FIG. 8 that are identical to FIG. 1 are assigned the same reference numeral, and their further explanation is accordingly omitted. To implement Embodiment 3, the following new elements are provided: response data registration unit 40, which is used to store the user's own voice, the voices of members of the family, friends' voices, and other response data; and response data memory unit 41, which stores the responses registered by using response data registration unit 40.

Figure 9:
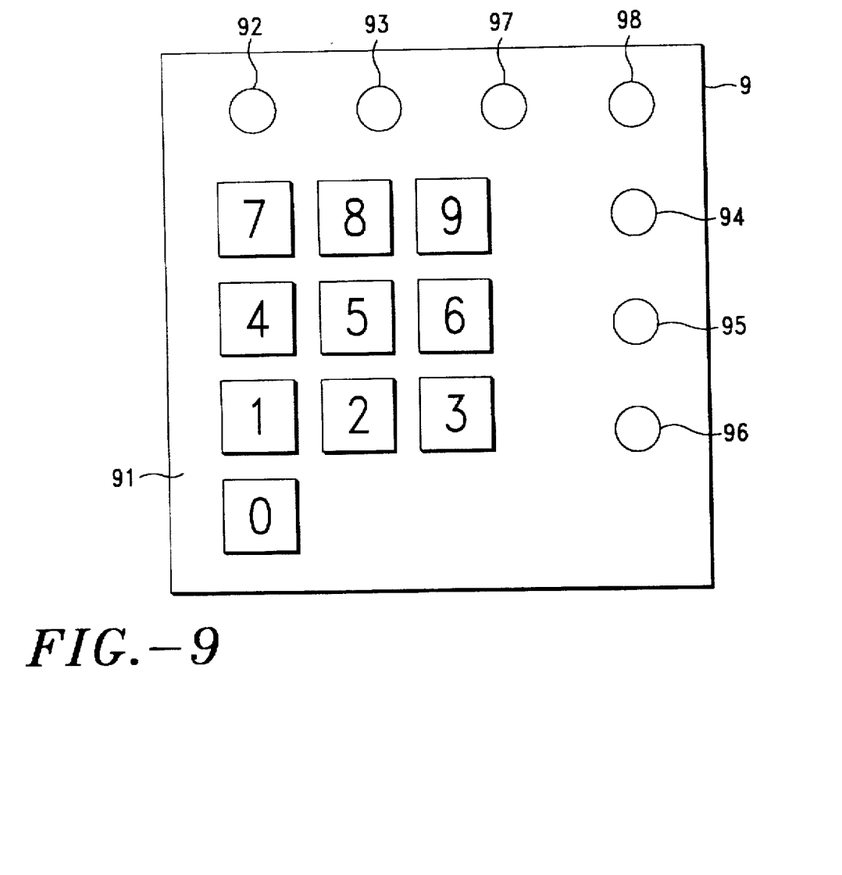
FIG. 9 illustrates an example setup switch according to the embodiment shown in FIG. 8.

Response data registration unit 40 creates response data that is compressed after the input voice received from voice input unit 1 is A/D converted. The response data created in this unit is stored in response data memory unit 41. It should be noted that registering of response data is done by pressing response message creation button 97 on setup switch 9 shown in FIG. 9. The setup switch 9 shown in FIG. 9 is for implementing Embodiment 3 and is basically the same as the setup switch shown in FIG. 3 except for the fact that this switch contains new buttons which are response message creation button 97 and response selection button 98. When response message creation button 97 is pressed, speech recognition dialogue management unit 4 sets the equipment's mode to the response data registration mode, thus enabling response data to be registered. When the response data registration mode is on, processing operations such as word detection, shown in the first and second preferred embodiments, are not performed. Further, response selection button 98 is a selection switch that allows the user to select either using pre-stored response contents or storing new data. When the use of pre-stored responses is selected speech recognition and dialogue management unit 4 references response data memory unit 5 When registering of new responses is selected, speech recognition dialogue management unit 4 references response data memory unit 41. The configuration of setup switch 9 is by no means limited to that shown in FIG. 9; other setup buttons can also be provided as necessary.

Figure 10:
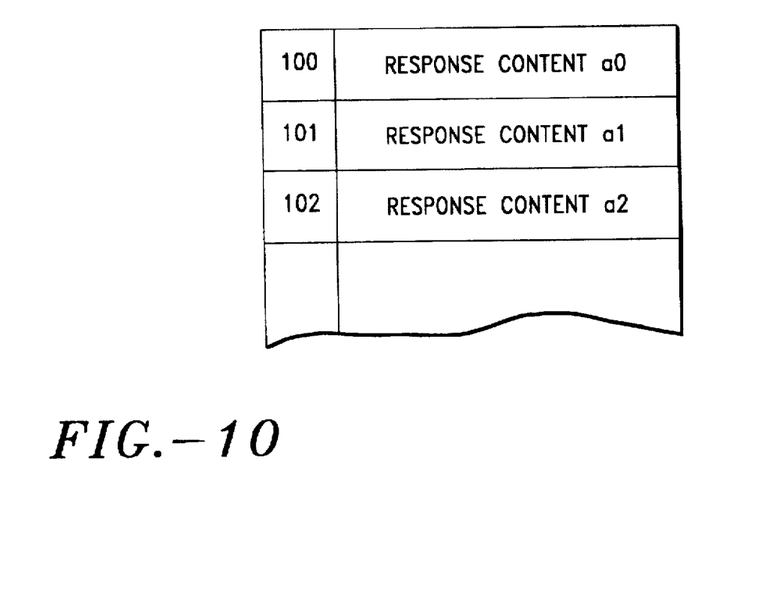
FIG. 10 shows a example response table stored in the response data memory unit of the embodiment shown in FIG. 8.

Referring to FIGS. 8 and 9, in this configuration, response messages may be created using the voice of the mother of the child who plays with the stuffed doll. To do so, first press the response message creation button 97 on setup switch 9, enter the number "100", for example, from number key 91, and let the mother enter some response messages. This creates response data corresponding to the contents of the input response message in response data registration unit 40, and the associated response data is stored in response data memory unit 41. In this manner, not only the mother but also other designated persons can enter new response contents. When this is done, respective response data (designated response content a0, response content a1, response content a2, . . . ). In response data memory unit 41, the respective response data is stored as response content a0, response content a1, response content a2, . . . corresponding to response content numbers 100, 101, 102, as shown in FIG. 10. The response data memory unit 41 may share memory with response data memory unit 5 shown in said Embodiments 1 and 2. In such a setup, response content numbers 0 through 99 can be assigned to previously stored response contents at addresses 0 through 99, for example, so that response content numbers beginning with 100 are used as newly stored response contents that are stored addresses 100 and beyond.

It is in this manner that response contents using new voices are stored. These newly stored response contents are pre-set as the response content to be generated in response to words spoken by a speaker. For example, to register response content a0 ("ohayou . . . (the child's name) . . . chan" in the mother's voice) for response content number 100 in response to the word associated with registered word 1 ("ohayou"), first press the numeric key "1" on number key 91, press response content number input button 96, press the numeric key "100" from number key 91, and then press end-of-response message registration button 95. In this manner, the response contents can be associated with the registered words spoken by the speaker.

When the word corresponding to registered word number 1 is voice-input by a speaker when response selection button 98 is turned to the registered response content side, the equipment responds according to response content a0. Thus, if the child playing with the stuffed doll directs "ohayou" at the doll, the doll replies "ohayou . . . (the child's name) . . . chan" in the mother's voice.

Although in this example response selection button 98 is provided to allow the selection between using previously stored response contents or newly stored response contents, selecting is by no means limited to these methods. Alternatively, certain conditions can be stored in the equipment beforehand so that the speaker's utterances match the conditions, one of the response contents is selected. Nor is the method for associating the registered words spoken by a speaker with response contents limited to the above-described method. Various methods are conceivable as is known in the voice recognition and data processing arts.

Further, as explained in conjunction with the first preferred embodiment, using setup switch 9 and numeric values beginning with "11", the user can register his own recognizable words, and he can store new response contents a0, a1, a2, corresponding to the newly stored words. Also, several response content numbers can be combined to create and store a variety of response contents, such as three responses, response content a0, response content a2, and response content a4.

Thus, according to the third preferred embodiment, responses using the voices of people close to the user, rather than a an actor's pre-recorded voice, can be stored. When applied to toys such as a stuffed doll, this embodiment can provide more enjoyable conversations with the user, which in this case would be a child. This prevents the toy from getting "old" quickly, a problem common to most toys.

Although the above embodiments include examples wherein the present invention is applied to a stuffed doll toy, the present invention is by no means limited to stuffed dolls. Naturally, it can be applied to other toys as well. Further, in addition to toys, the invention can be applied to interactive game machines and electronic appliances that are used in everyday life. And certainly, an ordinary skill in the voice recognition art can apply the invention to languages other than Japanese or English and still obtain the desired objects. Thus, the invention has a broad range of application.

While the invention has been described in conjunction with several specific embodiments and applications, it is evident to those skilled in the art that many further alternatives, modifications and variations will be apparent in light of the foregoing description. This may include, in addition to stuffed animal toys, such applications and embodiments as gaming machines, home electronics, computer subsystems, electronic appliances or similar devices. Thus, the invention described herein is intended to embrace all such alternatives, modifications, applications and variations as may fall within the spirit and scope of the appended claims.

What is claimed is:

1. An interactive speech recognition apparatus, comprising:

a voice input unit to receive voice and translate the received voice into digital form;

a voice analysis unit in communication with said voice input unit to generate characteristic voice data for the received digitized voice;

a non-specific speaker word identification unit in communication with said voice analysis unit to determine whether the characteristic voice data substantially matches standard characteristic voice information corresponding to pre-registered expressions and generate identified non-specific speaker expression data in response thereto;

a specific speaker word enrollment unit in communication with said voice analysis unit to register individual expressions spoken by a specific speaker and generate identified specific speaker expression data based on the characteristic voice data;

a speech recognition and dialogue management unit in communication with said non-specific speaker word identification unit and said specific speaker word enrollment unit to receive the identified non-specific speaker expression data and the identified specific speaker expression data respectively therefrom, for selecting one of said non-specific speaker word identification unit and said specific speaker word enrollment unit to recognize a meaning from the received voice based on the received identified expression data, and to formulate an appropriate response from existing response data corresponding to the recognized meaning;

a response creation function in communication with said speech recognition and dialogue management unit to enable a user to create response data based on speaker input; and a voice synthesizer in communication with said speech recognition and dialogue management unit to generate synthesized audio corresponding to the appropriate response formulated by said speech recognition and dialogue management unit.

2. The speech recognition apparatus of claim 1, wherein said specific speaker word enrollment unit further comprises:

a word enrollment unit in communication with said voice analysis unit to receive characteristic voice data generated by said voice analysis unit in response to prescribed individual expressions spoken by the specific speaker;

a standard pattern memory unit in communication with said word enrollment unit to store the characteristic voice data associated with the prescribed individual expressions as standard specific speaker patterns capable of recognition; and a word detection unit in communication with said standard pattern memory unit, said voice analysis unit and said speech recognition and dialogue management unit to determine whether the characteristic voice data generated by said voice analysis unit substantially matches the specific speaker patterns stored in said standard pattern memory unit and generate identified specific speaker expression data in response thereto.

3. The speech recognition apparatus of claim 2, wherein said word detection unit of said specific speaker word enrollment unit determines whether the characteristic voice data generated by said voice analysis unit substantially matches the speaker-adapted standard patterns stored in said standard pattern memory unit through DP matching techniques.

4. The speech recognition apparatus of claim 1, wherein said specific speaker word enrollment unit further comprises:

a word enrollment unit in communication with said voice analysis unit to receive characteristic voice data generated by said voice analysis unit in response to prescribed pre-registered expressions spoken by the specific speaker and generate speaker-adapted standard patterns capable of recognition based on the received characteristic voice data and standard non-specific speaker patterns associated with the prescribed pre-registered expressions;

a standard pattern memory unit in communication with said word enrollment unit to store the speaker-adapted standard patterns; and a word detection unit in communication with said standard pattern memory unit, said voice analysis unit and said speech recognition and dialogue management unit to determine whether the characteristic voice data generated by said voice analysis unit substantially matches the speaker-adapted standard patterns stored in said standard pattern memory unit and generate identified specific speaker expression data in response thereto.

5. The speech recognition apparatus of claim 1, further comprising:

a setup switch in communication with said speech recognition and dialogue management unit to selectively prompt for and capture speaker input information relating to individual expression registration operations.

6. The speech recognition apparatus of claim 1, further comprising:

a response data registration unit in communication with said voice input unit and said speech recognition and dialogue management unit to receive digitized voice generated by said voice input unit in response to prescribed individual responses spoken by the specific speaker;

a response data memory unit in communication with said speech recognition and dialogue management unit, said response data registration unit and said voice synthesizer to store the digitized voice corresponding to the prescribed individual responses and transfer digitized voice corresponding to the prescribed individual responses and predetermined responses to said voice synthesizer; and wherein said speech recognition and dialogue management unit formulates the appropriate response by accessing said response data memory and registration units.

7. The speech recognition apparatus of claim 6, further comprising:

a setup switch in communication with said speech recognition and dialogue management unit to selectively prompt for and capture speaker input information relating to individual response registration operations.

8. An interactive speech recognition method, comprising the steps of:

perceiving voice;

translating the perceived voice into corresponding digital form;

generating characteristic voice data for the perceived digitized voice;

enrolling specific speaker expressions spoken by a specific speaker;

determining whether the characteristic voice data generated in said characteristic voice data generating step substantially matches standard characteristic voice information corresponding to at least one of:

the specific speaker expressions enrolled in said specific speaker expression enrolling step; and non-specific speaker expressions prestored in memory;

generating identified expression data if it is determined in said determining step that the characteristic voice data generated in said characteristic voice data generating step substantially matches standard characteristic voice information by selecting one member of the group consisting of the specific-speaker and non-specific speaker expressions;

assimilating a contextual meaning based on the identified expression data generated in said identified expression data generating step;

formulating an appropriate response from existing response data based on said assimilated contextual meaning;

enabling a user to create response data based on speaker input; and synthesizing audio corresponding to the appropriate formulated response.

9. The speech recognition method of claim 8, wherein said specific speaker enrolling step comprises:

prompting the speaker for at least one specific speaker expression;

receiving characteristic voice data generated in said characteristic voice data corresponding to the prompted specific speaker expression; and storing the received characteristic voice data as standard specific speaker patterns capable of recognition; and wherein said determining step includes determining whether subsequent characteristic voice data generated by said voice analysis unit substantially matches the stored specific speaker patterns.

10. The speech recognition method of claim 8, further comprising:

optimizing prestored, non-specific speaker expressions for the specific speaker, comprising:

receiving characteristic voice data generated in said characteristic voice data generating step corresponding to a predefined non-specific speaker expression; and storing in memory the received characteristic voice data as specific speaker adapted patterns for the predefined speaker expression; and wherein said determining step includes determining whether subsequent characteristic voice data generated in said characteristic voice data generating step substantially matches the specific speaker adapted patterns stored in memory.

11. The speech recognition method of claim 8, further comprising:

prompting the speaker for a specific speaker response;

receiving digitized voice translated from the perceived voice in said translating step;

storing the received digitized voice data within a list of potential responses; and wherein said appropriate response formulating step includes interrogating the list of potential responses in connection with the assimilated contextual meaning.

* * * * *